Nov. 24, 1942. P. A. V. CHARTRAND 2,302,840
LOADING AND UNLOADING ELEVATOR
Filed Sept. 17, 1941
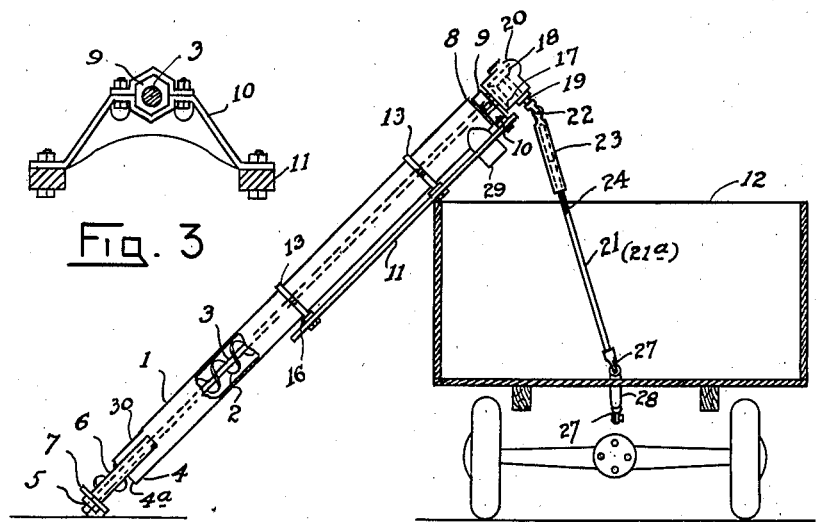
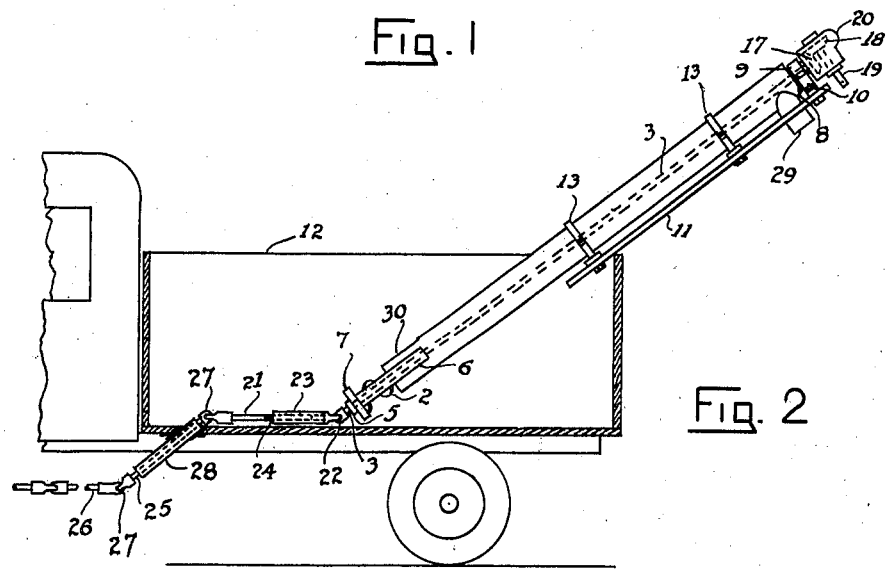
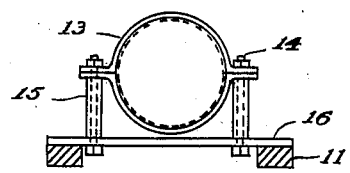
Inventor
Phillip A. V. Chartrand
by
Attorney.

Patented Nov. 24, 1942

2,302,840

UNITED STATES PATENT OFFICE 2,302,840

LOADING AND UNLOADING ELEVATOR

Phillip Albert Vincent Chartrand, Gleichen, Alberta, Canada

Application September 17, 1941, Serial No. 411,167
In Canada September 19, 1940

1 Claim. (Cl. 214—83)

My invention relates to improvements in grain loading and unloading devices, and has for its objects the elevation of any dry-flowing materials into and the unloading of the same out of the box of an automotive vehicle with respect to any desired point of delivery, also the provision of a flexibly operable power takeoff from the transmission gearing of the automotive vehicle itself, said power takeoff connection being adapted to operate at conventional transmission speeds for the handling of the material at varying rates of flow according to the nature of such material being transferred.

This device incorporates simple change over mechanism for reversing the conveyor-elevator loading operation from a loading device to an unloading device by the ready manipulation of certain elevating screw driving parts that are essential to both such requirements of the device.

An important advantage of my invention is its adaptability to a wide range of positions permitting maximum access to all grain levels, the intake end accommodating itself to varying grain levels as the grain pile reduces in volume. It has the further advantage of simplicity of operation and construction and also it requires a minimum of parts as compared with other more complicated loading and unloading machines at present in use for similar purposes.

I attain these objects and advantages by the mechanism illustrated in the accompanying drawing, in which—

Fig. 1 is an elevation of the tubular auger conveyor-elevator in place with its drive, for loading into a truck box.

Fig. 2 is a side elevation showing position of device for unloading from a truck box, and the drive mechanism penetrating through the bottom of the box.

Fig. 3 shows the delivery end screw shaft hexagonal bearing and bracket.

Fig. 4 is a detail of the elevator casing anchor straps.

Similar numerals refer to similar parts throughout the several views.

An inclined casing 1 is the tubular member enclosing an auger or screw conveyor-elevator with the screw 2 mounted on a shaft 3 coaxially bearable with respect to the said casing. Both screw and shaft project at the intake end 4 of the elevator, and are exposed for the pickup of the material being elevated into the throat 4a of the elevator. A bearing 5 for the said shaft 3 is outboardly supported at this low end of the elevator by side strap brackets 6 attached longitudinally to the casing 1. These brackets 6 hold a disc 7 in place on which disc the said bearing 5 is mounted. At the opposite end 8 of the casing 1 and disposed beyond the same a bearing 9 supports this projecting end of the screw shaft 3, which is mounted on a bracket member 10, this latter bracket being supported on a frame 11 that supports the whole of the conveyor-elevator unit, and would rest on the side or end wall of the truck box 12 into or from which box the material is being elevated. The casing 1 is attached rigidly to the said frame 11 by means of split hoops 13 clamped together and held in place on the said frame 11 by means of holding down bolts 14 distanced from the frame by pipe distance pieces 15, thereby clamping the casing securely to cross ties 16 forming part of the frame 11.

In the box loading process the screw shaft 3 is driven by means of a crown gear coupling combination consisting substantially of two meshed bevel gear wheels 17 and 18 mounted respectively on the screw shaft 3 and a perpendicularly mounted drive shaft 19. This drive and gearing unit is enclosed within a gear box 20, which box supports the bearing elements of the said shafts 3 and 19. The shaft 19 is rotated by a rotatable connecting shaft 21, being coupled thereto by a universal joint 22. The shaft 21 is extensible and is in two parts, one part 23 being an internally squared slidable member, and the other part 24 being the squared end of shaft 21 for slidable connection with the member 23.

In Fig. 2 this shaft 21 is shown in detail as for unloading, wherewith in Fig. 1 a similar extensible shaft 21a is shown for the loading operation. In each case the shafts 21 or 21a connect at truck box floor level with an intermediate drive shaft 25 passing through the floor to couple with the truck drive transmission gear extension shaft 26 as detailed in Fig. 2, the various lengths of these shafts being flexibly connected together by means of universal joints 27. A thimble 28 encloses the length of shaft 25 where it passes through the floor, which thimble is suitably attached to the floor to act as a guide and bearing member for the said shaft 25.

In the box unloading process distribution of the material may be made to any point nearby, when the universal joint 22 is disconnected from the short shaft 19, the elevator intake end 4 is placed within the truck box, and the said universal joint 22 is pin-connected with the end of the screw shaft projecting from the bearing plate or disc 7. The screw flight performance is the same for unloading as it is for loading the box, the difference being principally that the shaft 3 is driven from its opposite end when unloading. A discharge spout 29 is disposed towards the upper end 8 of the case 1 for directing the elevated material into the truck box when loading, and away from the truck box when unloading.

The intake end of the elevator case 1 is cut away at 30 in order to allow sufficient clearance for the entry of the material being elevated.

I claim:

An elevating device of the type described for loading and/or unloading material to and from the box of an automotive vehicle, comprising in combination, a tubular cased screw elevating conveyor, a bearably mounted screw shaft itself mounted coaxially within said casing, means connecting with the power transmission unit of said vehicle for rotatably driving the shaft and screw of said elevating conveyor by a universally jointed shaft passing through the floor of said vehicle box, an extensible drive shaft universally coupled to said universally jointed shaft for universal coupling to the elevated delivery end of the screw conveyor shaft for loading operations, an enclosed geared drive means embodying crown gear wheels at the elevated delivery end of the screw conveyor shaft permitting radial flexibility of said geared drive means through said extensible shaft, a crown gear wheel shaft universally coupled to said extensible drive shaft for crown gear drive purposes, and a frame to support this elevating conveyor device with straps and bolts and bolt distance pieces.

PHILLIP ALBERT VINCENT CHARTRAND.